United States Patent [19]

Musso et al.

[11] Patent Number: 5,766,511
[45] Date of Patent: Jun. 16, 1998

[54] NEAR-AZEOTROPIC COMPOSITIONS CONSTITUTED BY HYDROGENATED FLUOROCARBONS AND HYDROCARBONS, SUITABLE AS PROPELLANT FLUIDS FOR AEROSOL

[75] Inventors: Ezio Musso, Castelletto D'Orba; Giampiero Basile, Alessandria, both of Italy

[73] Assignee: Ausimont S.P.A., Milan, Italy

[21] Appl. No.: 768,379

[22] Filed: Dec. 17, 1996

[51] Int. Cl.$^6$ .............................. A61K 7/06; A61K 9/12; C09K 3/30
[52] U.S. Cl. .................. 252/305; 424/45; 424/47; 424/DIG. 1; 510/406; 510/408
[58] Field of Search .................. 252/305; 424/45, 424/47, DIG. 1; 510/406, 408

[56] References Cited

U.S. PATENT DOCUMENTS

| | | | |
|---|---|---|---|
| 4,174,295 | 11/1979 | Bargigia et al. | 252/305 |
| 5,182,040 | 1/1993 | Bartlett et al. | 252/305 X |
| 5,262,077 | 11/1993 | Bivens et al. | 252/305 X |
| 5,453,445 | 9/1995 | Henry | 424/45 |
| 5,620,631 | 4/1997 | Heiskel et al. | 252/305 |

FOREIGN PATENT DOCUMENTS

| | | |
|---|---|---|
| 0384371 | 2/1990 | European Pat. Off. |
| 9217558 | 10/1992 | WIPO |
| 9400529 | 1/1994 | WIPO |

OTHER PUBLICATIONS

European Search Report issued in subject application's corresponding European patent application No. EP 96 11 9763. Search Report is dated Feb. 17, 1997. 3 pages.

*Primary Examiner*—Richard D. Lovering
*Attorney, Agent, or Firm*—Nikaido Marmelstein Murray & Oram, LLP

[57] ABSTRACT

Use of near-azeotropic mixtures of hydrofluorocarbons with butane or isobutane selected from:
A) 1,1,1,2-tetrafluoroethane (HFC-134a) 5–88% by wt
   1,1,1,2,3,3,3-heptafluoropropane (HFC-227ea) 12–95% by wt
B) 1,1,1,2-tetrafluoroethane (HFC-134a) 10–87% by wt
   1,1,1,2,3,3,3-heptafluoropropane (HFC-227ea) 12–81% by wt
   n-butane 1–30% by wt
C) 1,1,1,2-tetrafluoroethane (HFC-134a) 18–69% by wt
   1,1,1,2,3,3,3-heptafluoropropane (HFC 227ea) 30–81% by wt
   isobutane 1–30% by wt
as propellant fluids for aerosol.

Said mixtures have zero ODP, very low GWP, no or low inflammability, insignificant pressure loss during the use and good solubility towards the typical solvents of aerosol formulations.

15 Claims, No Drawings

NEAR-AZEOTROPIC COMPOSITIONS CONSTITUTED BY HYDROGENATED FLUOROCARBONS AND HYDROCARBONS, SUITABLE AS PROPELLANT FLUIDS FOR AEROSOL

The present invention relates to some near-azeotropic mixtures and their use as propellant fluids for aerosol. The mixtures of the invention have a low polluting power since they show a zero ODP (Ozone Depleting Potential) value and low GWP (Global Warming Potential) and VOC (Volatile organic Compound) values.

In the aerosol field, CFC-11 ($CCl_3F$) and CFC-12 ($CCl_2F_2$) have been broadly used up to now as propellant fluids, characterized by a combination of favourable properties, such as non-flammability, non toxicity, chemical inertia and high solvent power, i.e. capacity of forming an homogeneous liquid phase with the other components of the formulations (in particular the active principles and their solvents, besides various auxiliary products).

It is however known that at present the manufacture and the commercialization of chlorofluorocarbons are submitted to severe restrictions all over the world for applications of this kind both owing to the destroying effect exerted by this product on the ozone layer present in the stratosphere, measured by the Ozone Depleting Potential (ODP), and owing to the contribution to the so called "greeenhouse effect", measured by Global Warming Potential (GWP).

The sectorial industry is therefore already directed since long towards alternative products having low ODP and GWP values. Among them, hydrocarbons are broadly used, thanks to their low cost and to their high efficiency in terms of volume supplied for weight unit, due to the low molecular weight. The use of hydrocarbons alone as propellants implies however various inconveniences, mainly bound to their high inflammability, which requires to adopt particular safety measures during manufacture and use.

Hydrocarbons, moreover constitute a source of environmental pollution since exposed to sun light in the presence of nitrogen oxides, undergo oxidative degradation phenomena with formation of the so called "eoxidizing smog" rich in ozone. Because of this negative feature, hydrocarbons, alike many other organic compounds, are classified as VOC (Volatile Organic Compound) compounds.

On the other hand a class of alternative products to CFC, which should provide equal performances without problems of environmental impact, is formed by chlorofluorocarbons containing hydrogen (HCFC) and by fluorocarbons containing hydrogen (HFC). These products are not of VOC type.

In particular it has been proposed as a substitute for CFC-12, 1,1,1,2-tetrafluoroethane (HFC-134a), a product having a low environmental impact (ODP=0, GWP=0.35), non flammable and with properties similar to those of CFC-12. HFC-134a, as propellant, however shows some limits bound to the vapour pressure higher than that of CFC-12 (at 50 C., 13.18 absolute bar for HFC-134a and 12.9 absolute bar for CFC-12), with consequent need to replan the containers which will have obviously to be homologated for the use at higher limit pressures. HFC-134a shows moreover a solvent power lower than that of CFC-12 towards many active principles, solvents and auxiliary products used in formulations for aerosol, with formation of undesired biphasic systems.

Since none of the HCFC and HFC proposed up to now has proved to be capable of replacing alone the CFC-11 and CFC-12, various multicomponent mixtures have been studied wherein the HCFC and/or HFC are mixed each other or also with other propellants, such as hydrocarbons, in order to optimize the performances thereof making them similar to those of the products to be replaced. To this end see for instance U.S. Pat. No. 4,174,295 and EP 384371. The later in particular describes the use of HFC-227ea mixtures with hydrocarbons in aerosol formulations. Said mixtures however show only a limited adjustment to the performances supplied by CFC-12, in particular as regards the exerted pressure.

It is indeed well known that a mixture of different chemical species generally involves a serious inconvenience, consisting in that during the use of a product containing a physically homogeneous formulation, a progressive removal of the propellant from the container occurs with a loss of pressure, and therefore of propulsion, which is much greater as higher is the difference among the boiling temperature of the single components. In the case of mixtures of compounds having very different volatilities among each other, the loss in propulsion can be so high as to make a part of the container load unusable.

From the functionality point of view as propellants, the best results are therefore obtainable by using only one component or, quite equivalently, a multicomponent composition of azeotropic type. The azeotropic compositions are characterized in that they show at the temperature of use the same composition in the liquid phase and in the vapour one; this allows to obtain a constant pressure and then a constant propulsion during the time until the complete exhaustion of the liquid contained in the aerosol preparation.

The obtainment of azeotropic mixtures is however an extremely unusual case, since it requires a particular combination between boiling temperatures and deviations from the ideal behaviour of the various components. Therefore, the study of the propellant mixtures is directed towards the obtainment of "near-azeotropic" mixtures. The definition which, among the various ones suggested so far, better suits the purposes of the present invention, is that, according to which, there is a nearly azeotropic behaviour if the pressure percent variation after the 50% evaporation of the liquid (indicated as $\Delta p/p.100$) at 25° C. is lower than 15% (to this purpose see the article of D. A. Didion and D. B. Bivens in Int. J. Refrig., vol. 13, p. 163 and on, 1990).

The Applicant has now unexpectedly found that mixtures formed by hydrofluorocarbons and hydrocarbons as defined hereinunder, have near-azeotropic behaviour, high solvent power, low inflammability and are therefore utilizable as propellant fluids for aerosol without showing any significant drop of the pressure during the utilization. Such mixtures are at the same time characterized by a very low or zero environmental impact, expressed in ODP, GWP and VOC terms.

Object of the present invention is therefore the use as aerosol propellant fluid of mixtures containing 1,1,1,2-tetrafluoroethane (HFC-134a), 1,1,1,2,3,3,3-heptafluoropropane (HFC-227ea) and, optionally, also n-butane and/or isobutane, selected from the group formed by:

| A) 1,1,1,2-tetrafluoroethane (HFC-134a) | 5–88% by wt |
|---|---|
| 1,1,1,2,3,3,3-heptafluoropropane (HFC-227ea) | 12–95% by wt |
| B) 1,1,1,2-tetrafluoroethane (HFC-134a) | 10–87% by wt |
| 1,1,1,2,3,3,3-heptafluoropropane (HFC-227ea) | 12–81% by wt |
| n-butane | 1–30% by wt |
| C) 1,1,1,2-tetrafluoroethane (HFC-134a) | 18–69% by wt |
| 1,1,1,2,3,3,3-heptafluoropropane (HFC 227ea) | 30–81% by wt |
| isobutane | 1–30% by wt |

N-butane is usually a commercial product which can contain up to 10% of isobutane. Similarly isobutane is usually a commercial product which can contain up to 10% of n-butane. Said mixtures have vapour pressure comprised in a wide range (between 9.5 and 13 absolute bar at 50° C.), which allows a wide flexibility in their use, and on the other hand they have the property that the percent variation of the vapour pressure of each single mixture after the 50% evaporation of the liquid at the temperature of 25° C. is comprised between 0.5 and 15% of the vapour pressure before said evaporation. Said mixtures show moreover zero ODP and low GWP and allow the reformulation of aerosol preparations with a remarkable reduction of the content in VOC.

Compared with the already mentioned mixtures containing HFC-227ea and hydrocarbons, the Applicant has found that the introduction of HFC-134a on the one hand has led to a greater efficiency as propellant gas and to a better matching with the CFC-12 pressure, on the other hand it has unexpectedly allowed to obtain near-azeotropic mixtures with the advantages previously described.

The mixtures of A type containing 30-80% of HFC-134a and 20-70% of HFC-227ea, the mixtures of B type containing 30-80% of HFC-134a, 12-68% of HFC-227ea and 2-10% of hydrocarbon and the mixtures of C type containing 20-53% of HFC-134a, 45-70% of HFC-227ea and 2-10% of hydrocarbon are preferred.

The above mentioned mixtures constitute a further object of the present invention.

Some working examples of the present invention are reported hereinunder, the purpose of which is merely illustrative but not limitative of the scope of the invention itself.

EXAMPLES 1-3 AND COMPARATIVE EXAMPLE 4 various mixtures have been prepared according to the present invention: in Table 1 are reported the main chemical-physical data of the mixtures and in Table 2 the results of the solubility tests of said mixtures in typical solvents for aerosol formulations. Each mixture has been characterized as follows:

(a) Near-azeotropic behaviour

The mixture, having known composition and weight, is introduced in a small cylinder with an inner volume equal to 150 cm$^3$, previously evacuated. The filling volume ratio is firstly equal to 0.8. The cylinder is introduced in a thermostatic bath at 25° C. As soon as the equilibrium has been reached, the inner pressure is measured by means of a pressure transducer. The content of the cylinder is partly discharged by an appropriate valve, until the cylinder weight reaches the value corresponding to 50% of the initial load, maintaining the temperature at 25° C. The pressure inside the pipe is measured again at 25° C. The mixture has near-azeotropic behaviour if the pressure drop, expressed as percentage with respect to the initial pressure ($\Delta p/p.100$), is comprised between 0.5 and 15%, preferably between 0.5 and 7%. Although the $\Delta p/p.100$ value is not the direct measurement of azeotropy, it is however indicative of an azeotropic behaviour.

(b) Boiling temperature

By using the same cylinder described above, filled with the refrigerating mixture until a volume ratio equal to 0.8 and immersed in the thermostatic bath, the boiling temperature is determined by slowly decreasing the temperature of the thermostatic bath until the equilibrium pressure of 1.013 bar is reached: the temperature corrsponding to such a pressure is the boiling temperature of the mixture.

(c) Inflammability

The inflammability of the examined mixtures has been evaluated by means of a test which allows to reveal flame propagation when the mixture under examination is supplied on a burner placed at a determined distance.

A burner with oxidizing flame constituted by a Bunsen burner placed near the zero of an horizontal graduated bar so that the third upper part of a flame of about 5 cm is at the same heigth of the delivering valve of a small spray cylinder. The mixture under exmination is introduced in the cylinder and thermostated at the temperature of 20° C. The cylinder is placed at the distance of 15 cm from the burner and the mixture to be checked is supplied in liquid phase on the flame.

The following evaluation criteria of inflammability have been adopted: the mixture is considered non flammable if any propagation or increase of the burner flame is noticed; the mixture is considered slightly flammable if a slight increase of the flame without propagation is observed; the mixture is considered flammable if propagation of the flame, independently from the flame length, is noticed.

(d) ODP and GWP

They have been calculated on the basis of the known values of the pure components constituting the mixture (average weight), referred to CFCl$_3$.

(e) Solvent power

For the mixtures potentially utilizable as propellant the solubility in typical solvents for aerosol formulations has been determined. A typical solvent for aerosol formulations is introduced in a glass-tube of a volume equal to 15 cm$^3$, with thick walls and closed at an end by a metal valve. After cooling at about 0° C., the concerned mixture is introduced in the test-tube previously evacuated, in such an amount as to obtain a concentration of propellant equal to 50% by weight. The pipe is then shaken and immersed in thermostatic bath. The measurements are carried out at 0°, 25° and 50° C.: the mixture is considered soluble (S) if only one homogeneous and limpid phase is noticed, partially soluble (PS) if the propellant results soluble for at least 90%, even if two distinct phases form.

Tables 1 and 2 stress the characteristics of binary and ternary mixtures according to the invention: near-azeotropic behaviour, such as to assure a constant working pressure and then a substantially constant propulsion during the time until exhaustion of all the liquid propellant; high solubility in the other components of aerosol formulations; low inflammability; very low or zero environmental impact.

TABLE 1

Near-azeotropic propellant compositions: chemical-physical data

| EX. | Composition (% by weight) | | Vapour pressure at 25° C. (bar) | Density at 25° C. (g/cm$^3$) | B.P. °C. | Near-azeotropic behaviour (100$\Delta$P(-50%)/P | Inflammability** | ODP*** | GWP*** |
|---|---|---|---|---|---|---|---|---|---|
| 1 | HFC-134a | 80.0 | 6.5 | 1.24 | -25.5 | 1.2 | N.F. | 0 | 0.40 |
|   | HFC-227ea | 20.0 | | | | | | | |
| 2 | HFC-134a | 68.5 | 6.64 | 1.23 | -25.5 | 2.7 | N.F. | 0 | 0.45 |

TABLE 1-continued

Near-azeotropic propellant compositions: chemical-physical data

| EX. | Composition (% by weight) | | Vapour pressure at 25° C. (bar) | Density at 25° C. (g/cm³) | B.P. °C. | Near-azeotropic behaviour (100ΔP(−50%)/P | Inflammability** | ODP*** | GWP*** |
|---|---|---|---|---|---|---|---|---|---|
|  | HFC-227ea | 29.7 |  |  |  |  |  |  |  |
|  | HC-600 | 1.8 |  |  |  |  |  |  |  |
| 3 | HFC-134a | 60.0 | 6.32 | 1.13 | −25.6 | 5.7 | F. | 0 | 0.43 |
|  | HFC-227ea | 30.0 |  |  |  |  |  |  |  |
|  | HC-600 | 10.0 |  |  |  |  |  |  |  |
| 4* | HCFC-12 | 100.0 | 6.43 | 1.31 | −29.5 | 0 | N.F. | 1 | 2.93 |

*Comparative example
**Referred to the liquid: F = flammable; N.F. = non flammable.
***With repsect to CFCl₃

TABLE 2

Solubility of the propellant compositions in typical solvents for aerosol formulations (°)

| | Ethyl alcohol | | | | Acetone | | | | Ethyl acetate | | | |
|---|---|---|---|---|---|---|---|---|---|---|---|---|
| | solvent | temperature °C. | | | solvent | temperature °C. | | | solvent | temperature °C. | | |
| Ex. | conc. % | 0 | 25 | 50 | conc. % | 0 | 25 | 50 | conc. % | 0 | 25 | 50 |
| 1 | 50.0 | S | S | S | 49.8 | S | S | S | 50.1 | S | S | S |
| 2 | 47.4 | S | S | S | 49.0 | S | S | S | 47.5 | S | S | S |
| 3 | 50.0 | S | S | S | 48.7 | S | S | S | 49.1 | S | S | S |
| 4* | 47.9 | S | S | S | 46.5 | S | S | S | 50.3 | S | S | S |

| | Methylene chloride | | | | n-heptane | | | | Toluene | | | |
|---|---|---|---|---|---|---|---|---|---|---|---|---|
| | solvent | temperature °C. | | | solvent | temperature °C. | | | solvent | temperature °C. | | |
| Ex. | conc. % | 0 | 25 | 50 | conc. % | 0 | 25 | 50 | conc. % | 0 | 25 | 50 |
| 1 | 50.1 | S | S | S | 49.9 | PS | S | S | 49.9 | S | S | S |
| 2 | 50.3 | S | S | S | 48.3 | PS | S | S | 49.4 | S | S | S |
| 3 | 49.3 | S | S | S | 47.3 | S | S | S | 50.0 | S | S | S |
| 4* | 48.2 | S | S | S | 50.5 | S | S | S | | | | |

Comparative example. (°) S = soluble; PS = partially soluble.

EXAMPLES 5–7

AEROSOL FORMULATIONS

Example 5
Preparation of cosmetic foam:
Glycerine 9.40% by weight
Triethanolamine 4.70% by weight
Stearic acid 3.76% by weight
Myristic acid 2.35% by weight
Coconut oil 1.47% by weight
Perfume 0.38% by weight
Fluorinated surfactant 0.94% by weight
Water 71.00% by weight
Propellant according to Ex.1 6.00% by weight Example 6
Preparation of cologne:
Perfume 4.00% by weight
Ethanol 51.00% by weight
Propellant according to Ex.1 45.00% by weight Example 7
Preparation of hair spray:
Polyvinylpyrrolidone 4.00% by weight
Ethanol 33.00% by weight
Propellant according to Ex.3 63.00% by weight.

We claim:

1. A process for preparing a propellant fluid for aerosol by mixing 1,1,1,2-tetrafluoroethane (HFC-134a), 1,1,1,2,3,3,3-heptafluoropropane (HFC-227ea) and, optionally, also n-butane and/or isobutane, to obtain compositions selected from the group consisting of:

| A) 1,1,1,2-tetrafluoroethane (HFC-134a) | 5–88% by wt |
|---|---|
| 1,1,1,2,3,3,3-heptafluoropropane (HFC-227ea) | 12–95% by wt |
| B) 1,1,1,2-tetrafluoroethane (HFC-134a) | 10–87% by wt |
| 1,1,1,2,3,3,3-heptafluoropropane (HFC-227ea) | 12–81% by wt |
| n-butane | 1–30% by wt; and |
| C) 1,1,1,2-tetrafluoroethane (HFC-134a) | 18–69% by wt |
| 1,1,1,2,3,3,3-heptafluoropropane (HFC 227ea) | 30–81% by wt |
| isobutane | 1–30% by wt. |

2. The process according to claim 1 wherein the propellant fluid is a mixture of A type.

3. The process according to claim 1 wherein the propellant fluid is a mixture of B type.

4. The process according to claim 1 wherein the propellant fluid is a mixture of C type.

5. The process according to claim 1 wherein the propellant fluid is a mixture of 30–80% by weight of 1,1,1,2-tetrafluoroethane and 20–70% by weight of 1,1,1,2,3,3,3-heptafluoropropane.

6. The process according to claim 1 wherein the propellant fluid is a mixture of 30–80% by weight of 1,1,1,2-tetrafluoroethane, 12–68% by weight of 1,1,1,2,3,3,3-heptafluoropropane and 2–10% by weight of n-butane.

7. The process according to claim 1 wherein the propellant fluid is a mixture of 20–53% by weight of 1,1,1,2-tetrafluoroethane, 45–70% by weight of 1,1,1,2,3,3,3-heptafluoropropane and 2–10% by weight of isobutane.

8. A propellant fluid consisting of the following compositions:

| | | |
|---|---|---|
| A) | 1,1,1,2-tetrafluoroethane (HFC-134a) | 5–88% by wt |
| | 1,1,1,2,3,3,3-heptafluoropropane (HFC-227ea) | 12–95% by wt |
| B) | 1,1,1,2-tetrafluoroethane (HFC-134a) | 10–87% by wt |
| | 1,1,1,2,3,3,3-heptafluoropropane (HFC-227ea) | 12–81% by wt |
| | n-butane | 1–30% by wt; or |
| C) | 1,1,1,2-tetrafluoroethane (HFC-134a) | 18–69% by wt |
| | 1,1,1,2,3,3,3-heptafluoropropane (HFC 227ea) | 30–81% by wt |
| | isobutane | 1–30% by wt. |

9. The propellent fluid according to claim 8 wherein the propellant fluid is the mixture of A.

10. The propellent fluid according to claim 8 wherein the propellant fluid is the mixture of B.

11. The propellent fluid according to claim 8 wherein the propellant fluid is the mixture of C.

12. The propellent fluid according to claim 8 wherein the propellant fluid is the mixture of 30–80% by weight of 1,1,1,2-tetrafluoroethane and from 20–70% by weight of 1,1,1,2,3,3,3-heptafluoropropane.

13. The propellent fluid according to claim 8 wherein the propellant fluid is the mixture 30–80% by weight of 1,1,1,2-tetrafluoroethane 12–68% by weight of 1,1,1,2,3,3,3-heptafluoropropane and 2–10% by weight of n-butane.

14. The propellent fluid according to claim 8 wherein the propellant fluid is the mixture 30–80% by weight of 1,1,1,2-tetrafluoroethane 12–68% by weight of 1,1,1,2,3,3,3-heptafluoropropane and 2–10% by weight of n-butane.

15. The propellent fluid according to claim 8 wherein the propellant fluid is the mixture 20–53% by weight of 1,1,1,2-tetrafluoroethane, 45–70% by weight of 1,1,1,2,3,3,3-heptafluoropropane and 2–10% by weight of isobutane.

* * * * *